United States Patent
Brands

[11] Patent Number: 6,148,084
[45] Date of Patent: Nov. 14, 2000

[54] RESTRICTEDLY BLINDABLE CERTIFICATES ON SECRET KEYS

[76] Inventor: Stefanus A. Brands, V.d. Mondestraat 75, NL-3515 BC Utrecht, Netherlands

[21] Appl. No.: 08/973,587

[22] PCT Filed: Jun. 27, 1996

[86] PCT No.: PCT/NL96/00265

§ 371 Date: Dec. 5, 1997

§ 102(e) Date: Dec. 5, 1997

[87] PCT Pub. No.: WO97/02679

PCT Pub. Date: Jan. 23, 1997

[30] Foreign Application Priority Data

Jun. 30, 1995 [NL] Netherlands ............ 1000703

[51] Int. Cl.$^7$ ........................................ H04L 9/30
[52] U.S. Cl. .................. 380/279; 380/30; 705/69; 713/156; 713/180
[58] Field of Search .................... 380/21, 24, 30, 380/28, 278, 279, 282; 713/180, 156; 705/69

[56] References Cited

U.S. PATENT DOCUMENTS

| 5,521,980 | 5/1996 | Brands | 380/30 |
| 5,606,617 | 2/1997 | Brands | 380/30 |

FOREIGN PATENT DOCUMENTS

| 95 04417 | 2/1995 | WIPO | H04L 9/32 |
| 96 12362 | 4/1996 | WIPO | H04L 9/32 |
| 96 31034 | 10/1996 | WIPO | H04L 9/32 |

OTHER PUBLICATIONS

S. A. Brands "Restrictive Blinding of Secret–Key Certificates" Centrum voor Wikunde Report, CS–9509 (Feb. 1995, Amsterdam).

S. A. Brands "Secret–Key Certificates" Centrum voor Wikunde Report, CS–9555 (Jul. 1995, Amsterdam).

S. A. Brands, "Untraceable Off–Line Cash in Wallet With Observers" Proceedings of Crypto '93 pp. 302–318.

P. Horster et al "Meta–Elgamal Signature Schemes", Technical Report TR–941–5–F, 1994 University of Technology Chemnitz–Zwickau 16 pages.

P. Horster et al "Meta–Message Recovery and Meta–Blind Signature Schemes Based on the Discrete Logarithm Problem and Their Applications" Asiacrypt '94 Proceedings pp. 224–237.

*Primary Examiner*—Pinchus M. Laufer
*Attorney, Agent, or Firm*—Banner & Witcoff, Ltd.

[57] ABSTRACT

A method for an issuer party to issue DSA-like secret-key certificates that can be blinded only restrictively. The method includes the step of generating a secret key $(x_0, y)$ and a public key $(\text{descr}(G_q), g, h_0, g_1, \text{descr}(\mathcal{H}(\bullet)))$, wherein q is a prime number, Gq is a group of order q, in which computing discrete logarithms is substantially infeasible, but in which multiplication, determination of equivalence of elements and generation of substantially random numbers is relatively easy, $\text{descr}(G_q)$ is a description of $G_q$ including q, $\text{descr}(\mathcal{H}(\bullet))$ is the description of a hash-function $\mathcal{H}(\bullet)$ for which computing inverses is substantially infeasible, $x_0$, and y are elements of the ring, $\mathbb{Z}_q$ of integers modulo q, g is an element of order q in the group, $G_q$, $h_o$ is equal to $g^{x_0}$; and $g_1$ is equal to $g^y$. The method further includes the step of issuing to a receiver party a secret-key certificate $(r, \bar{a})$ in $\mathbb{Z}_q \times \mathbb{Z}_q$ on a public key h in $G_q$, the secret key certificate being generated with a computer such that $(g^{d/c} h^{r/c})$ mod q is equal to $\bar{a}$, where c is computed by applying $\mathcal{H}(\bullet)$ to at least h.

5 Claims, 7 Drawing Sheets

RESTRICTEDLY BLINDABLE CERTIFICATES ON SECRET KEYS

BACKGROUND OF THE INVENTION

1. Field of the Invention

The present invention relates to cryptographic techniques, and more particularly to systems for issuing and showing of DSA-like secret-key certificates that can be blinded only restrictively.

2. Description of the Prior Art

Secret-key certificate systems are described and claimed in U.S. Pat. No. 5,606,617, issued on Feb. 25, 1997, to the present applicant. Triples consisting of a secret key, a corresponding public key and a secret-key certificate on the public key can only be obtained by engaging in a certificate issuing protocol with a Certification Authority. The difference with the technique of public-key certificates, well-known in the art, is that pairs consisting of a public key and a secret-key certificate on the public key can be generated by anyone without the assistance of the Certification Authority.

Mechanisms for transporting digital signatures often require a Certification Authority of issue triples, consisting of a secret key, a matching public key, and a certificate of the Certification Authority on the public key. Of particular interest for privacy-protecting mechanisms for signature transport are so-called restrictive blind certificate issuing protocols, in which the receiver can blind the issued public key and the certificate, but not a predetermined non-trivial predicate of the secret key ("non-trivial" meaning that the predicate is at least one bit of information); this part of the secret key is invariant under any blinding operations that can feasibly be applied by the receiver, and hence the Certification Authority can encode information into it that cannot be altered. Restrictive blind certificate issuing protocols, and methods for applying them to privacy-protecting mechanisms for value transfer such as in particular off-line electronic cash, are described and claimed in U.S. Pat. No. 5,522,980 issued May 28, 1996, to the present applicant.

U.S. Pat. No. 5,521,980, issued May 29, 1996, and U.S. Pat. No. 5,606,617, issued Feb. 27, 1992, describe and claim restrictive blind certificate issuing protocols for secret-key certificates based on the Discrete Logarithm problem as well as on the RSA problem, both of which are believed in the art to be intractable. In particular the security of the described secret-key certificates and restrictive blind issuing protocols relies on the security of Schnorr digital signatures (see: Schnorr, C., "Efficient Signature Generation by Smart Cards," Journal of Cryptology, Vol. 4, No. 3, 1991, pp. 161–174), on the security of Guillou-Quisquater digital signatures (see: Guillou, L. and Quisquater, J., "A practical zero-knowledge protocol fitted to security microprocessor minimizing both transmission and memory," Lecture Notes in Computer Science 330, Proceedings of Eurocrypt '88, Springer-Verlag 1989, pp. 123–128), or on the security of other digital signatures with similar characteristics, commonly referred to in the art as Fiat-Shamir type digital signatures.

Most of the secret-key certificate issuing protocols described in U.S. Pat. No. 5,521,980, issued May 18, 1996, and U.S. Pat. No. 5,606,617, issued Feb. 25, 1997, are restrictive blind only when the issuing protocol is executed sequentially, in case different blinding-invariant numbers are involved. This means that the Certification Authority should send new initial information for a next execution of the protocol only after is has received a challenge number for the previous execution of the protocol, in case distinct blinding-invariant numbers are involved. To enable the Certification Authority to perform executions of the issuing protocol in parallel without any limitations, the inventive and generally applicable method described in Dutch patent application NL 9500584, filed Mar. 27, 1995, by the present applicant, can be applied, to immunize against attacks in parallel execution mode.

U.S. Pat. No. 5,606,617, issued Feb. 27, 1997, describes a secret-key certificate system based on DSA digital signatures (see: NIST, "Specifications for a digital signature standard (DSS)," Federal Information Processing Standards Pub. (draft), Aug. 19, 1991). However it is highly unclear how an issuer could issue these certificates by means of an efficient restrictive blind issuing protocol. A restrictive blind issuing protocol for certificates based on DSA digital signatures is not yet known in the art, and neither is a secure protocol for showing such certificates. Because DSA signatures have been standardized in the U.S., and the security of DSA signatures is not necessarily dependent on the security of Schnorr or other Fiat-Shamir type digital signatures, restrictive blind issuing certificate protocols and showing protocols based on DSA digital signatures are believed to be of considerable practical interest, especially if executions of the issuing protocol could be performed in parallel without limitation. Privacy-protecting mechanisms for value transfer based on such DSA-like certificates are likewise believed to be of practical relevance.

OBJECTS OF THE INVENTION

Accordingly, it is an object of the present invention to allow DSA-like secret-key certificates to be issued in a restrictive blind issuing protocol.

Another object of the present invention is to ensure that executions of the restrictive blind issuing protocol can be performed in parallel without limitation.

A further object of the present invention is to allow DSA-like secret-key certificates to be shown without revealing the secret key.

Yet another object of the present invention is to apply DSA-like secret-key certificates in the construction of off-line electronic cash systems with untraceable payments.

A still further object of the present invention is to allow efficient, economical, and practical apparatus and methods fulfilling the other objects of the invention.

Other features, objects, and advantages of this invention will be appreciated when the description and appended claims are read in conjunction with the figures.

SUMMARY OF THE INVENTION

Figure 1:
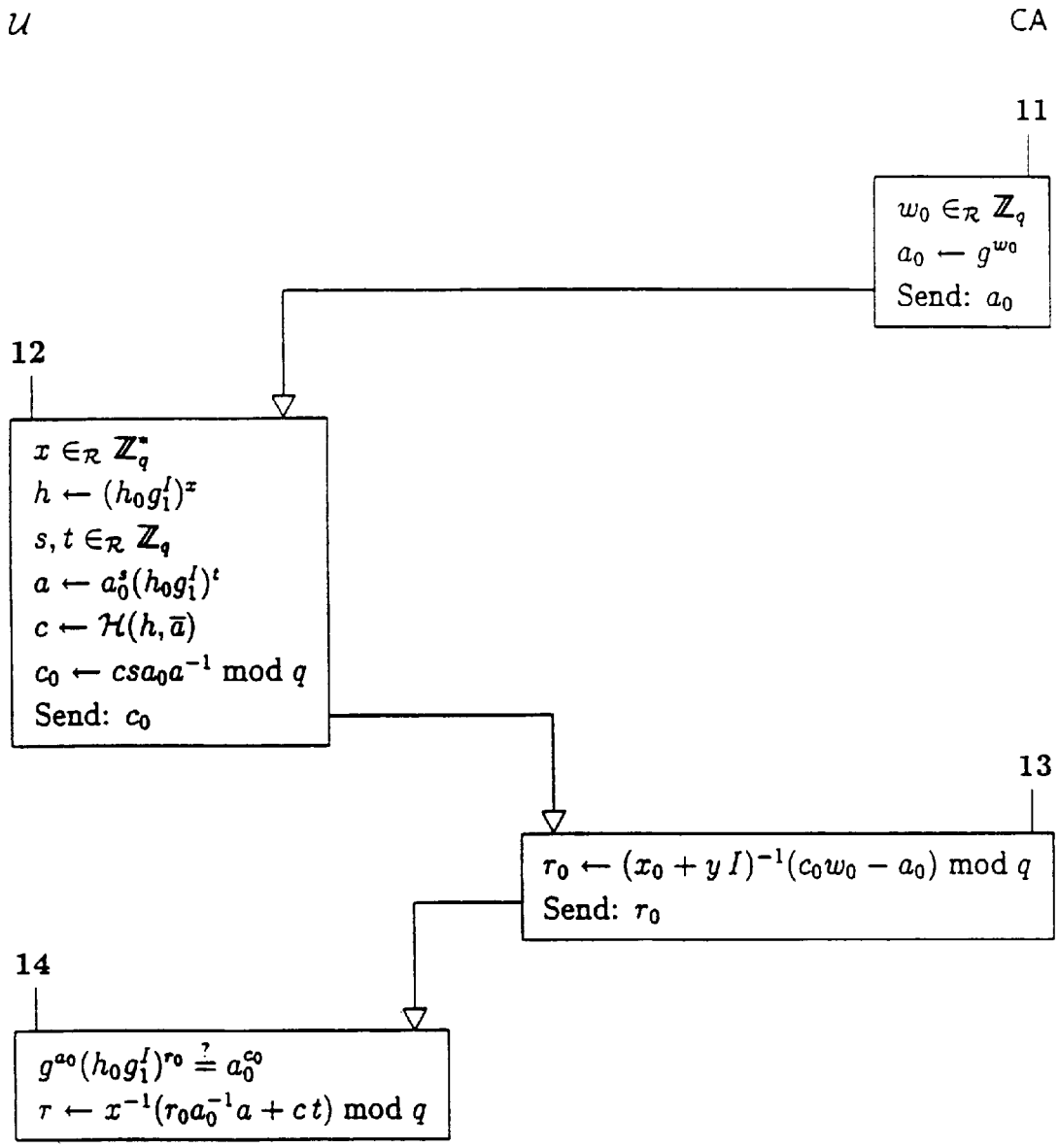
FIG. 1 shows a flowchart of a restrictive blind issuing protocol for DSA-like secret-key certificates, in accordance with the teachings of the present invention.

In accordance with these and other objects of this invention, a brief summary of the invention is presented. Some simplifications and omissions may be made in the following summary, which is intended to highlight and introduce some aspects of the present invention, but not to limit its scope. Detailed descriptions of preferred exemplary embodiments adequate to allow those of ordinary skill in the art to make and use this invention will be provided later.

In an issuing protocol for secret-key certificates, a designated party called a Certification Authority issues triples. Each triple consists of a secret key, a corresponding public key and a certificate of the Certification Authority on the public key. If the issuing protocol is restrictive blind, then a receiver party that obtains such a triple can ensure that the public key and the certificate are uncorrelated to the view of the Certification Authority; but on the other hand the receiver party cannot dispose information into this predicate of the secret key, and so the Certificate Authority can encode information into this predicate of the secret key. This property should preferably hold even when executions of the issuing protocol can be performed in parallel without limitation. A summary of the forming of secret-key certificates in accordance with the present invention follows.

The secret key of the Certification Authority is a pair $(x_0,y)$ in $\mathbb{Z}_q \times \mathbb{Z}_q$ where q is a prime number. The symbol $\mathbb{Z}_q$ denotes the set of numbers $\{0, \ldots, q-1\}$, with addition and multiplication defined modulo q. The corresponding public key of the Certification Authority is $(\text{descr}(G_q), g, h_0, g_1, \text{descr}(\mathcal{H}(\bullet)))$, whereby $G_q$ is a multiplicative group containing q elements and $\text{descr}(G_q)$ denotes a description of $G_q$ including q; g is an element of order q in the group $G_q$; $h_0$ is equal to $g^{x_0}$; $g_1$ is equal to $g^y$; and $\text{descr}(\mathcal{H}(\bullet))$ is the description of a one-way hash-function, preferably such that it is substantially infeasible to find collisions.

A secret-key certificate on a public key h in $G_q$ of the receiver party is a pair $(r,\bar{a})$ in $\mathbb{Z}_q \times \mathbb{Z}_q$ such that $\bar{a}$ equals $(g^{\bar{a}}/ch^{r/c})$ mod q. Here c is equal to $\mathcal{H}(h,\bar{a})$, although in other variations more arguments can be included or $\bar{a}$ may be left out. A secret key of the receiver party corresponding to its public key h is a pair $(\alpha_1,\alpha_2)$ in $\mathbb{Z}_q \times \mathbb{Z}_q$ such that $h_0^{\alpha_1} g_1^{\alpha_2}$ equals h.

When issuing in a restrictive blind manner triples consisting of a secret key $(\alpha_1,\alpha_2)$ a corresponding public key h unequal to 1 and a certificate on h, the quotient $\alpha_1^{-1}\alpha_2$ mod q, denoted by I, forms the blinding-invariant part of the secret key of the receiver party. In the issuing protocol the Certification Authority generates a random number $w_0$ in $\mathbb{Z}_q$ and computes a number $\alpha_0$ for the receiver party by raising g to the power $w_0$. The receiver party computes its public key h by raising $h_0 g_1^I$ to a random non-zero power, and computes a challenge number $c_0$ for the Certification Authority on the basis of h and a blinded form of $a_0$. The Certification Authority then computes a response, $r_0$, by applying its secret key $(x_0,y)$ to I, $w_0$ and the provided challenge $c_0$; the response should be such that $g^{r_0}(h_0 g_1^I)^{r_0}$ equals $a_0^{c_0}$. The provided response $r_0$, if correct, is enough for the receiver party to compute one blinded secret-key certificate on its restrictively blinded public key h.

By applying inventive methods and techniques of U.S. Pat. No. 5,521,980 issued May 28, 1996, to this DSA-like secret-key certificate system, off-line electronic cash systems with untraceability of payments can be constructed, as will be demonstrated on the basis of two different embodiments in the detailed description.

DETAILED DESCRIPTION OF THE INVENTION

While it is believed that the notation of FIGS. 1 to 7 would be clear to those of ordinary skill in the art, it is first reviewed here for definiteness.

The flowcharts describe protocols. The actions performed by the parties participating in these protocols are groups together into flowchart boxes. The party performing the actions described in a flowchart box is indicated by the column that the box is in, and is denoted by a column label. The Certification Authority is abbreviated by CA, and a receiver party by U. In some cases a plurality of people might collectively be thought of as a party, while in other cases a physical device or those who control it from time to time may be regarded as a party. Thus the parties denoted by single boxes or collections of boxes might sometimes be regarded as agents who perform a step or a collection of steps in a protocol. They might also be regarded as means for performing those steps, and might be comprised of any suitable configuration of digital logic circuitry. For example, any box or collection of boxes from the figures could be realized by hard-wired and dedicated combinatorial logic, or by some sort of suitably programmed machine, a microprocessor for instance, such as are well-known in the art, just as long as it is able to perform the storage, input/output and transformational steps (possibly apart from the random source functions) described by the corresponding box or boxes.

As is common in the art, for any integer, l, the symbol $\mathbb{Z}_l$ denotes the set of number $\{0, \ldots, l-1\}$. Addition and multiplication of elements in $\mathbb{Z}_l$ are defined modulo l. The symbol $\mathbb{Z}_l^*$ denotes the set of number in $\{0, \ldots, l-1\}$ that are co-prime to l. Multiplication of elements in $\mathbb{Z}_l^*$ is defined modulo l. $\mathbb{Z}_l$ is called a ring of integers modulo l, and $\mathbb{Z}_l^*$ is called a multiplicative group of integers modulo l.

The symbol "←" denotes assignment, meaning that the variable or symbol on its left-hand side is assigned the value on its right-hand side to. Assignments do not necessarily imply that storage space must actually be reserved; they may indicate intermediate values manipulated in volatile memory.

Another operation is a test for equality, which is indicated by the $\stackrel{?}{=}$ symbol. The behaviour of a protocol in the case an equality does not hold depends on the application for which the protocol is used and is hence often not specified; unless explicitly specified otherwise, the protocol can without loss of generality be assumed to halt.

The symbol $\epsilon_R$ indicates that the number, or each of the numbers, on its left-hand side is chosen from the ring or group on its right-hand side according to a uniform probability distribution, and independent of anything else. In practice pseudo-random techniques may be used, and the deviation from independence and a uniform distribution may be significant without this necessarily resulting in an appreciable loss in security.

Another action is denoted by the word "Send," followed by a colon and a number. This indicates that the number is sent by the party performing the actions described in the box to the other party participating in the protocol. The directed connections between the boxes indicate the order in which the actions that are grouped in the boxes are performed.

The forming of DSA-like secret-key certificates will now be described in detail. The secret key of the CA is a pair $(z_0,y)$ in $\mathbb{Z}_q \times \mathbb{Z}_q$ where q is a prime number. The corresponding public key of the CA is $(descr(G_q),g,h_0,g_1, descr(\mathcal{H}(\bullet)))$, whereby $G_q$ is a multiplicative group containing q elements and $descr(G_q)$ denotes a description of $G_q$ including q; g is an element of order q in the group $G_q$; $h_0$ is equal to $g^{x_0}$; $g_1$ is equal to $g^y$; and $descr(\mathcal{H}(\bullet))$ is the description of a hash-function for which it is substantially infeasible to compute inverses. Preferably $\mathcal{H}(\bullet)$ is also collision-intractable, meaning that it is substantially infeasible to determine distinct arguments that are mapped by $\mathcal{H}(\bullet)$ to the same outcome. Furthermore $\mathcal{H}(\bullet)$ should preferably not map its arguments to 0.

The group $G_q$ must be such that efficient algorithms are known for multiplying, for determining equivalence of elements, and for generating substantially (pseudo-)random numbers. Furthermore no feasible algorithms for computing discrete logarithms in $G_q$ should be known. Various choices for such groups are well-known in the art, such as the unique subgroup of q elements of a group $\mathbb{Z}_p^*$ for a prime p such that p−1 is an integer multiple of q, or an elliptic curve of order q over a finite filed, and for this reason no explicit choice for $G_q$ is made here. An expression such as $g^y$ must always be interpreted as a computation in $G_q$. In case computations are performed modulo q, such as for example in $r_0 \leftarrow (x_0+yI)^{-1}(c_0w_0-a_0)$ mod q, the modulo operator is always shown explicitly. Using this convention the exemplary notation $(g^{\bar{a}}/ch^{r/c})$ mod q means that $g^{\bar{a}}/ch^{r/c}$ is computed in the group $G_q$, and that the outcome of the computation is subsequently reduced modulo q.

A secret-key certificate on a public key h in $G_q$ of U is a pair $(r,\bar{a})$ in $\mathbb{Z}_q \times \mathbb{Z}_q$ such that $\bar{a}$ equals $(g^{\bar{a}}/ch^{r/c})$ mod q. Here c is equal to $\mathcal{H}(h,\bar{a})$. It will be clear to those of ordinary skill in the art that the presence of $\bar{a}$ in $\mathcal{H}(h,\bar{a})$ is not mandatory (afterall, in the DSA scheme also merely the message is hashed), but its inclusion is believed to benefit security and should hence be preferable. Of course, other information may be included in the hash as well. A secret key of U is a pair $(\alpha_1,\alpha_2)$ in $\mathbb{Z}_q \times \mathbb{Z}_q$ such that $h_0^{\alpha_1}g_1^{\alpha_2}$ equals h.

As will be clear to those of ordinary skill in the art, this definition of secret-key certificates is in accordance with the inventive methods and techniques described and claimed in U.S. Pat. No. 5,606,617, issued Feb. 25, 1997, by the present applicant. In particular the scheme detailed above is derived from a slight modification of the DSA digital signature scheme in accordance with methods described in U.S. Pat. No. 5,606,617, issued Feb. 25, 1997. In terms of the notation used here, the modification is that a DSA signature $(r,\bar{a}) \in \mathbb{Z}_q \times \mathbb{Z}_q$ by the CA on a message m must now satisfy the verification relation $(g^{\bar{a}}/ch_0^{r/c})$ mod $q=\bar{a}$, instead of $(g^{c/r}h^{-\bar{a}/r})$ mod $q=\bar{a}$. Furthermore the DSS, the standard for DSA, makes the explicit choice $G_q \subset \mathbb{Z}_p^*$ for $G_q$, for a prime p such that p−1 is a multiple of q.

Turning now to FIG. 1, a flowchart of a restrictive blind issuing protocol for these DSA-like secret-key certificates will now be described in detail. In the protocol, the CA issues triples consisting of a secret key $(\alpha_1,\alpha_2)$, a corresponding public key h, and a certificate $(r,\bar{a})$ of the CA on the public key h. The quotient, $\alpha_1^{-1}\alpha_2$ mod q, of the two numbers in the secret key will be encoded by the CA into the secret key of U during the execution of the restrictive blind certificate issuing protocol. This quotient forms the blinding-invariant part of the secret key, and is denoted by I. The protocol is believed to have the desirable property that I cannot be blinded (modulo q) even when executions of the protocol are performed without limitation in parallel, by many users each having a different I.

Box 11, first line, shows the CA generating a random number $w_0$ in $\mathbb{Z}_q$. The second line shows the CA computing $g^{w_0}$, for later reference denoted by $a_0$. In case this number is equal to 0 modulo q the CA generates a new $W_0$ and a corresponding new $a_0$, but in practice this event should have negligible probability. As described by the third line, the CA then sends $a_0$ to U.

Box 12, first line, shows U generating a random number x in $\mathbb{Z}_q^*$; the pair (z,Ix mod q) is its secret key, where I is the information the CA encodes into the secret key. The second line shows U computing the corresponding public key h, by computing $(h_0g_1^I)^x$. As shown by the third line, U also generates two random numbers s, t in $\mathbb{Z}_q$ that will serve to obtain a blinded r and a blinded a. The fourth line shows U computing $a_0^s(h_0g_1^I)^t$, for later reference denoted by a. In case this number is equal to 0 modulo q, U generates a new s or t and a corresponding new a, but in practice this event should have negligible probability. As indicated by the fifth line, U then computes $\mathcal{H}(h,\bar{a})$, denoted by c; where $\bar{a}$ denotes a mod q. The sixth line specifies U computing the "challenge" $csa_0a^{-1}$ mod q, denoted by $c_0$. Finally, as shown by the seventh line, U sends $c_0$ to the CA.

Box 13, first line, shows the CA computing the "response" $(x_0+yI)^{-1}(c_0w_0-a_0)$ mod q, for later reference denoted by $r_0$. As described by the second line, the CA then sends $r_0$ to U.

Box 14, first line, shows U verifying whether $g^{a_0}(h_0g_1^I)^{r_0}$ equals $a_0^{c_0}$; in a practical implementation U could skip this verification for greater efficiency. As described by the second line, in case the verification holds U computes $x^{-1}(r_0a_0^{-1}a+ct)$ mod q, denoted by r.

As those of ordinary skill in the art can easily verify, the pair $(r,\bar{a})$ is a secret-key certificate on the public key h of U, such that U knows the secret key corresponding to (x,Ix mod q). This certificate issuing protocol is believed to be restrictive blind, with blinding-invariant number I mod q, even in case the CA allows executions of the protocol to be performed in parallel when different blinding-invariant numbers I are involved. As will be clear the value h=1 must be declared invalid, since otherwise U could take x equal to 0.

Figure 2:
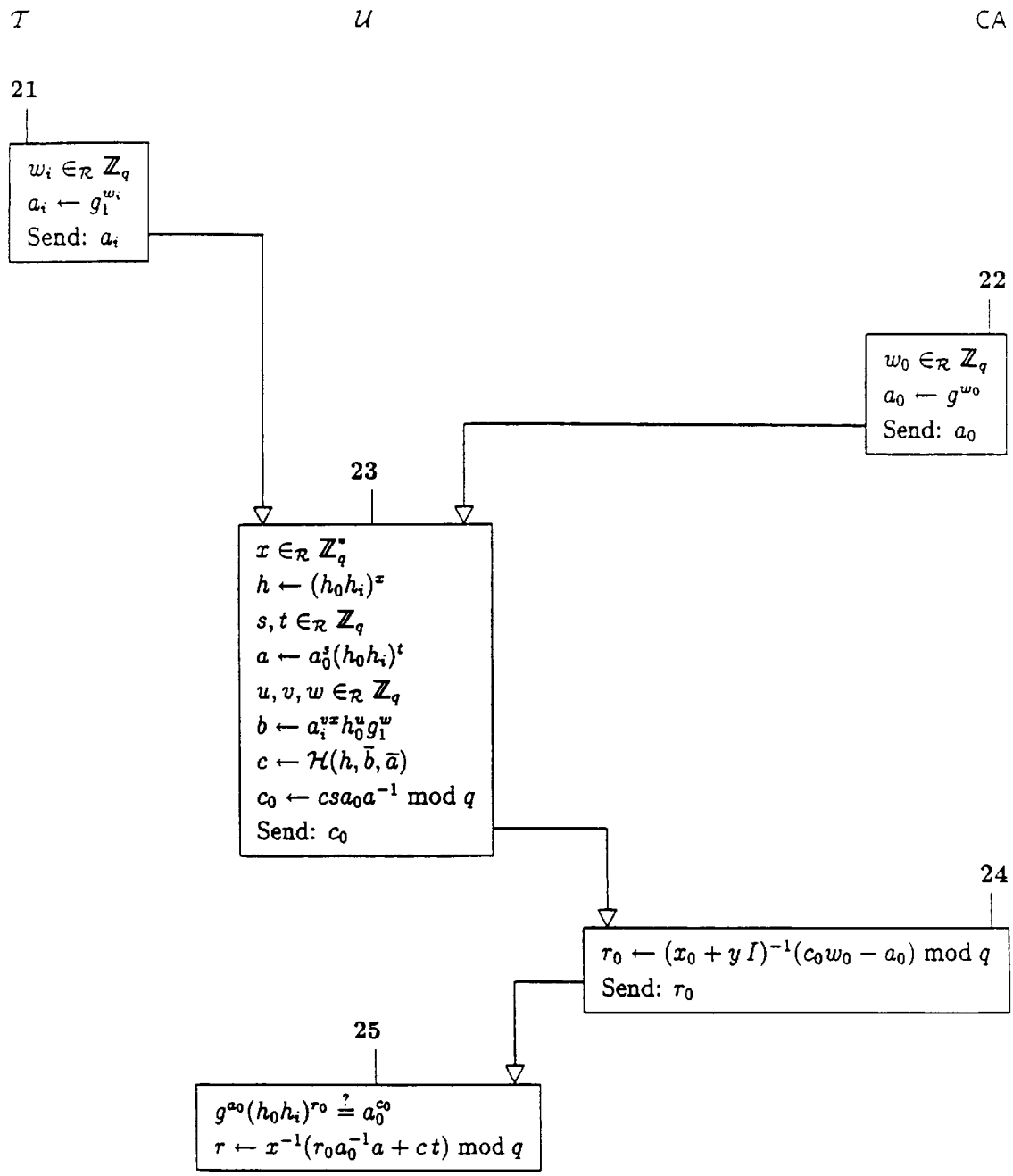
FIG. 2 shows a flowchart of a first coin withdrawal protocol based on the restrictive blind secret-key certificate issuing protocol of FIG. 1, in accordance with the teachings of the present invention.
Figure 3:
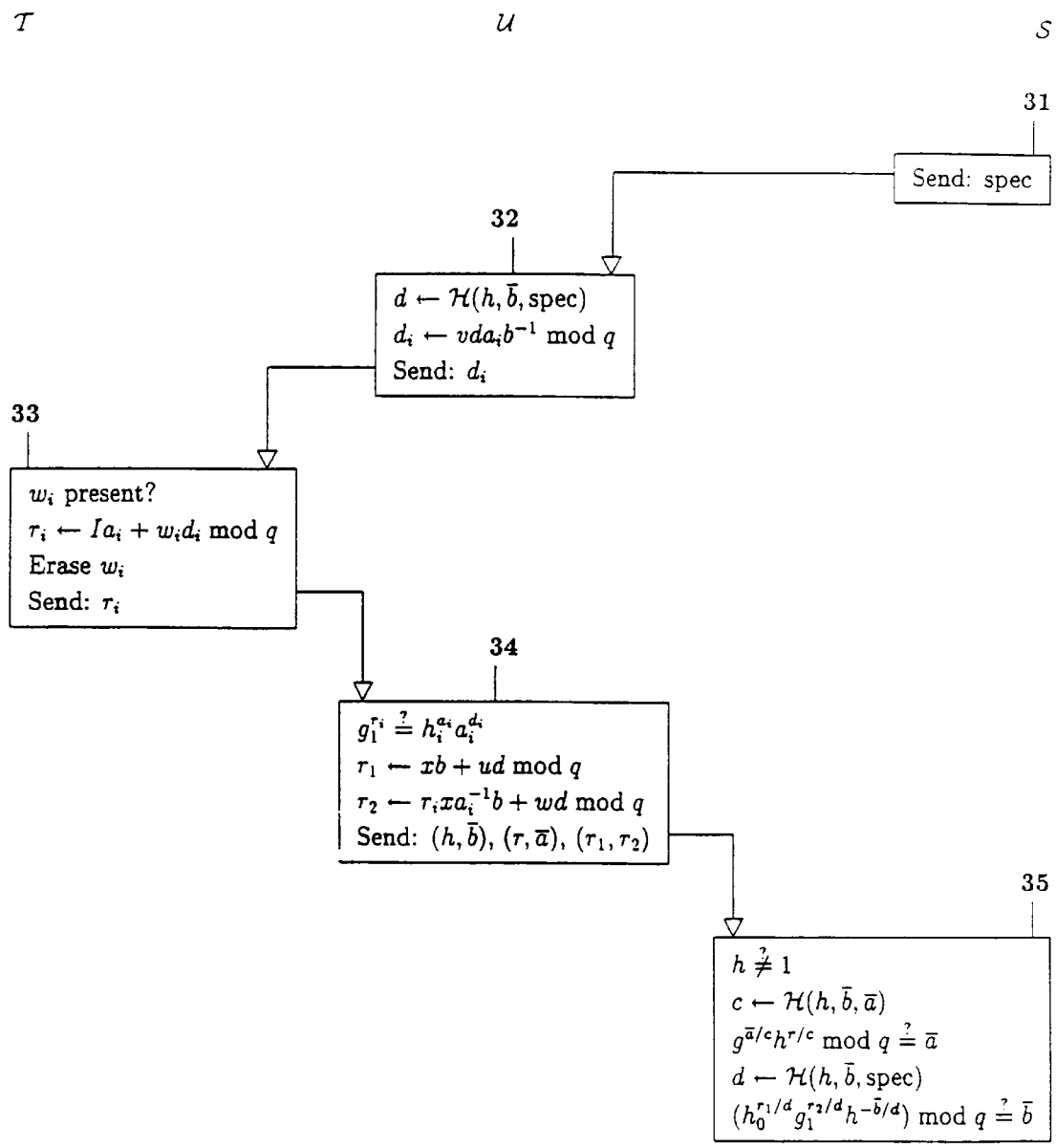
FIG. 3 shows a flowchart of a first coin spending protocol based on the coin withdrawal protocol of FIG. 2, in accordance with the teachings of the present invention.

FIGS. 2, 3 en 4 together describe a privacy-protecting off-line electronic coin system, in accordance with techniques described and claimed in U.S. Pat. No. 5,521,980, issued May 28, 1996. The methods and techniques of U.S. Pat. No. 5,521,980, issued May 28, 1996, for the coin withdrawal protocol are hereto applied to the protocol described by FIG. 1; and the methods and techniques for the coin payment protocol are by way of example applied to a digital signature scheme that is related to the DSA digital signature scheme. The flowcharts describe a setting whereby U (representing an account holder) obtains from the CA (representing a bank) a tamper-resistant computing device. This computing device is denoted by the symbol "T", and it prevents U from spending the same coin more than once. In accordance with the preferred embodiments of U.S. Pat. No. 5,521,980, issued May 28, 1996, all protocols are constructed in such a manner that U can moderate all communication between T and the outside world, such that no information can leak from T to the outside world and vice versa. Furthermore S, denoting a shop in the payment protocol, and T cannot even develop mutually known numbers that are statistically correlated. All manner of variations that satisfy less stringent privacy criteria can be obtained straightforwardly by modifying the protocol, and a simplification not offering prior restraint against double-spending can be made by letting U perform the role of T as well.

Turning now to FIG. 2, a flowchart describing a coin withdrawal protocol in an off-line electronic coin system, based on the issuing protocol described by FIG. 1, will now be described in detail. The number $I$ is uniquely linked to the account of U. It has been generated by the CA in a substantially random manner from $\mathbb{Z}_q$ and has been stored by the CA into T before providing T to U; it is a secret key of T. The number $g_1^I$ is the corresponding public key of T, and must be known to at least U. From now on $g_1^I$ is denoted by $h_i$.

The first line of Box 21 shows T generating a random number $w_i$ in $\mathbb{Z}_q$. The second line shows T computing $g_1^{w_i}$, for later reference denoted by $a_i$. In case this number is equal to 0 modulo q, T generates a new $w_i$ and a corresponding new $a_i$, but in practice this event should have negligible probability. As described by the third line, T then sends a, to U.

Box 22 is the same as Box 11.

Box 23 resembles Box 12. The first four lines are identical, although now U does not know I and hence h, replaces $g_1^I$. Lines five and six are new. The fifth line shows U generating three random numbers u, v, w in $\mathbb{Z}_q$. Line six shows U blinding the number $a_i$ of T to $a_1^{vx}h_0^u g_1^w$, for later reference denoted by b. In case this number is equal to 0 modulo q. U generates a new u, v or w and a corresponding new b, but in practice this event should have negligible probability. Line seven is almost the same as line five of Box 12, the difference being that b mod q, denoted by $\bar{b}$, is also a part of the argument to the hash-function $\mathcal{H}(\bullet)$. Lines eight and nine are identical to lines six and seven of Box 12.

Box 24 is the same as Box 13.

Box 25 is the same as Box 14.

The pair $(r,\bar{a})$ is a secret-key certificate of the CA on the one-time public key $(h,\bar{b})$ of U and T, such that U and T together, but not U alone, know the secret key (z,Ix mod q) corresponding to $h$, as well as the secret key (u, $w_i$vx+w mod q) corresponding to b.

Turning now to FIG. 3, a flowchart describing a coin spending protocol, for spending a coin withdrawn in accordance with the flowchart of FIG. 2 to a receiving party S, will now be described in detail.

The first line of Box 31 shows S sending a specification, denoted by "spec," U. Appropriate formats for "spec" are described in U.S. Pat. No. 5,521,980, issued May 28, 1996. For example "spec" comprises the identity or an account number of S, and date and time of transaction. It is conceivable that S need not supply "spec" to U because U can determine it by itself.

The first line of Box 32 shows U computing the number $\mathcal{H}(h,\bar{b},\text{spec})$, denoted by d. To prevent d from containing privacy-compromising information, U determines a blinded form of d. As shown by the second line U hereto computes $vda_ib^{-1}$ mod q, denoted by $d_i$. The third line shows U subsequently sending $d_i$ to T. As will be clear to those of ordinary skill in the art, d need not necessarily be determined using the same hash function, $\mathcal{H}(\bullet)$, as that used in FIG. 2, and the choice is merely for concreteness.

The first line of Box 33 shows T verifying whether $w_i$ is present in its memory. If this is the case and d≠0 mod q, T computes as shown by the second line the number $Ia_i+w_id_i$ mod q, denoted by $r_i$. As shown by the third line T then erases $w_i$ from memory. Of course, in practice the random number of T can be generated from, say, a block-cipher based hash function having suitable pseudo-random properties, and then the erasing means that T increments a sequence number to the pseudo-random generator from which it has generated $w_i$. Finally T sends the number $r_i$ to U, as shown by the fourth line.

The first line of Box 34 shows U verifying whether the number $r_i$ supplied by T is correct. If this is the case, U computes as shown by the second line the number xb+ud mod q, denoted by $r_1$. As shown by the third line U also computes the number $r_ixa_i^{-1}b+wd$ mod q, denoted by $r_2$. The fourth line shows U sending to S the one-time public key (h, $\bar{b}$), the certificate $(r,\bar{a})$ and the computed numbers $(r_1, r_2)$.

The first line of Box 35 shows S verifying the correctness of the one-time public key. The second and third lines show S verifying the correctness of the certificate $(r,\bar{a})$. The fourth and fifth lines show S verifying that the responses $r_1$ and $r_2$ of U correspond to "spec"; $(r_1,r_2)$ is a digital signature of U (and T) on "spec", with respect to the one-time public key $(h,\bar{b})$ of U. It is noted that the security of this digital signature is related to that of DSA signatures. In case all verifications by S hold, S accepts the payment.

Figure 4:
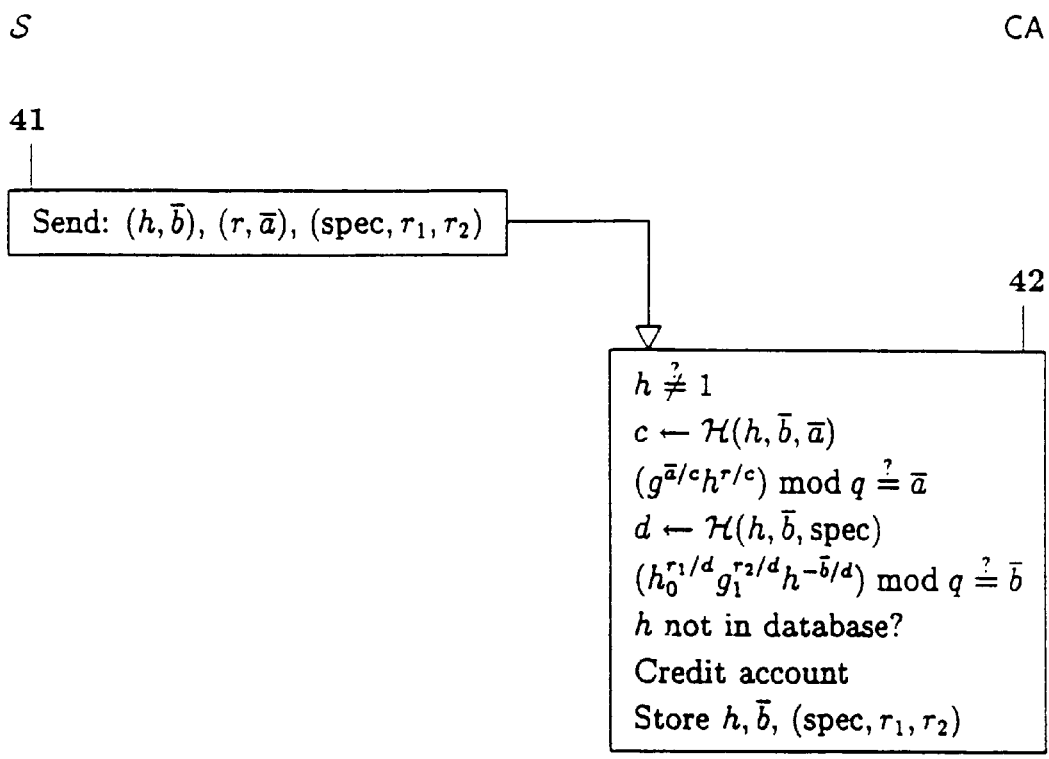
FIG. 4 shows a flowchart of a first coin depositing protocol based on the coin spending protocol of FIG. 3, in accordance with the teachings of the present invention.

Turning now to FIG. 4, a flowchart describing a coin deposit protocol, for depositing at the CA a coin spent in accordance with the flowchart of FIG. 3, will now be described in detail.

The first line of Box 41 shows S sending to the CA what may be called the payment transcript, consisting of $(h,\bar{b})$, (R, $\bar{a}$), and $(\text{spec},r_1,r_2)$.

Box 42 is largely the same as Box 35. In particular the first five lines are the same; the CA verifies whether the payment transcript is correct. As shown by the sixth line the CA then checks whether h has not already been deposited before, as part of the same or another payment transcript. In case h has not yet been deposited, the CA credits the account of the party specified in "spec," as shown by the seventh line. A shown by the line eight the CA stores $(h,\bar{b})$, (spec,$r_1$, $r_2$) in its deposit database.

Not shown in FIG. 4 are the actions of the CA in case the verification shown by the sixth line does not hold, meaning that h has been deposited already in an earlier stage. In case "spec" for the previously deposited payment transcript is not identical to "spec" of the new payment transcript, some party has managed to double-spend the coin. The CA can then compute from the already stored challenge, denoted by d', and the already stored pair, denoted by $(r'_1,r'_2)$, of the old payment transcript, and d and the pair $(r_1,r_2)$ of the new payment transcript, the number $I$ belonging to the account holder that withdrew the coin. Namely, as can easily be verified by those of ordinary skill in the art, $I$ is equal to $(r_1 d' - r'_1 d)^{-1} (r_2 d' - r'_2 d) \bmod q$.

The protocols specified by FIGS. 2, 3 and 4 are based on the use of a DSA-like signature in the coin payment protocol. Likewise $T$ in the ensemble of coin withdrawal and coin spending protocols performs a DSA-like identification protocol, which is believed to hide its secret $I$. As will be appreciated many variations can be applied. For example it is not difficult to let $T$ instead perform a Schnorr identification protocol, well-known in the art and referenced already in the background description. In that case the precise manner in which $U$ in Box 23 blinds the number $a_i$ needs to be adjusted, and also the verification and computation of $r_2$ from $r_i$, as specified by Box 34, have to be modified. Furthermore one can replace the digital signature provided by $U$ and $T$ in the payment protocol by a so-called Okamoto signature (see: Okamoto, T., section 6.1. of "Provably Secure and Practical Identification Schemes and Corresponding Signature Schemes," Crypto '92, Lecture Notes in Computer Science 740, Springer-Verlag (1993), pp. 31–53). Again a few minor modifications need to be made. By way of illustration it will now be described in detail how both changes can be applied at the same time ($T$ performs Schnorr identification and in the payment protocol an Okamoto signature is provided).

Figure 5:
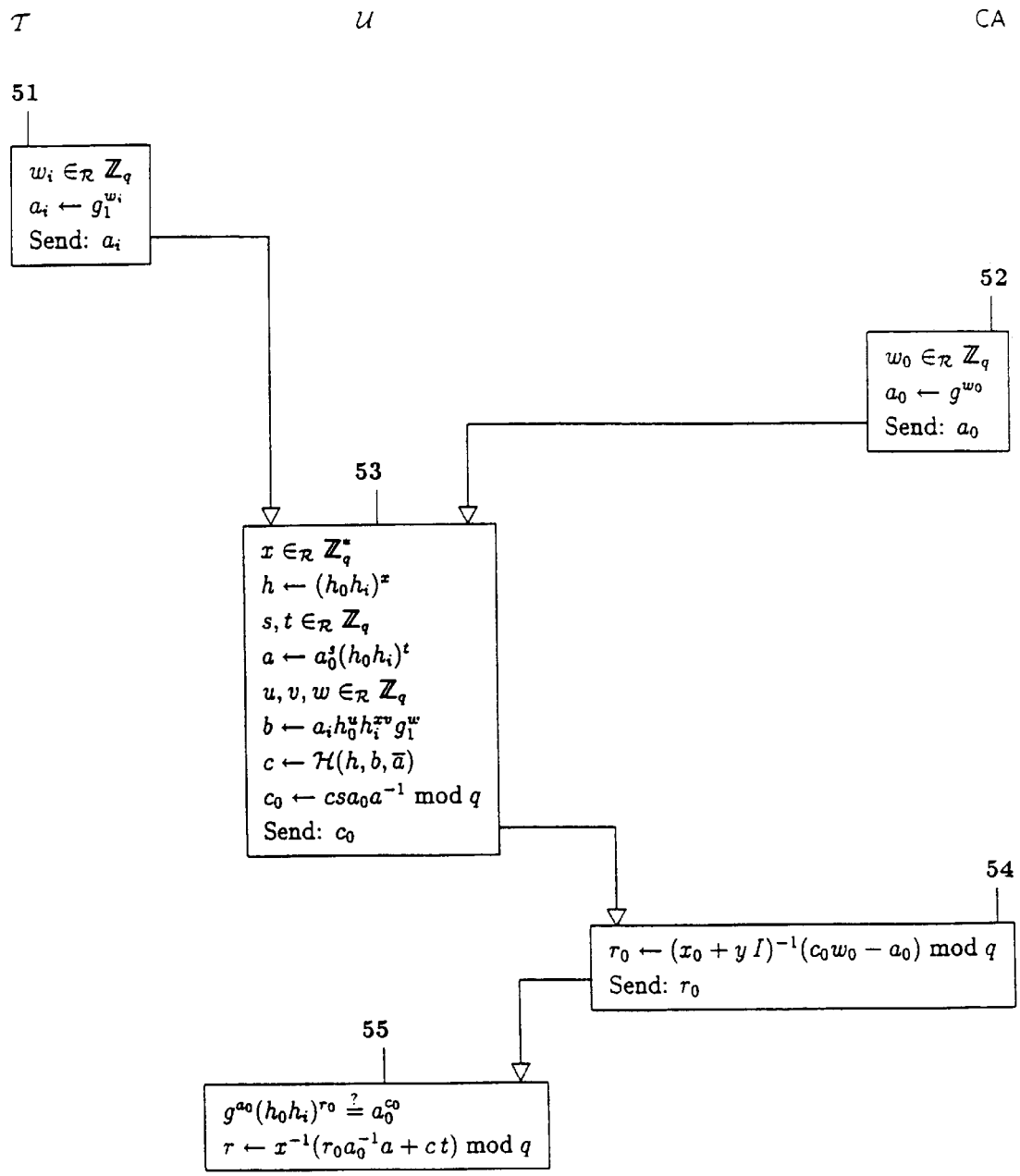
FIG. 5 shows a flowchart of a second coin withdrawal protocol based on the restrictive blind secret-key certificate issuing protocol of FIG. 1, in accordance with the teachings of the present invention.

Turning now to FIG. 5, a flowchart describing an adjusted coin withdrawal protocol in an off-line electronic coin system, based on the issuing protocol described by FIG. 1, will now be described in detail. The set-up of the protocol is the same as described for FIG. 1.

Box 51 is the same as 21, with the minor difference that $a_i$ is now allowed to be equal to 0 mod q.

Box 52 is the same as Box 22.

Box 53 is similar to Box 23. The only difference is in lines six and seven. As shown by the sixth line $U$ this time blinds $a_i$ to $a_i h_0'' h_i^{xv} g_1^w$ instead of to $a_i^{vx} h_0'' g_1^w$; moreover b is allowed to be equal to 0 mod q. In the computation of $c_0$, in line seven, this time b is incorporated, instead of b mod q.

Box 54 is the same as Box 24.

Box 55 is the same as Box 25.

Figure 6:
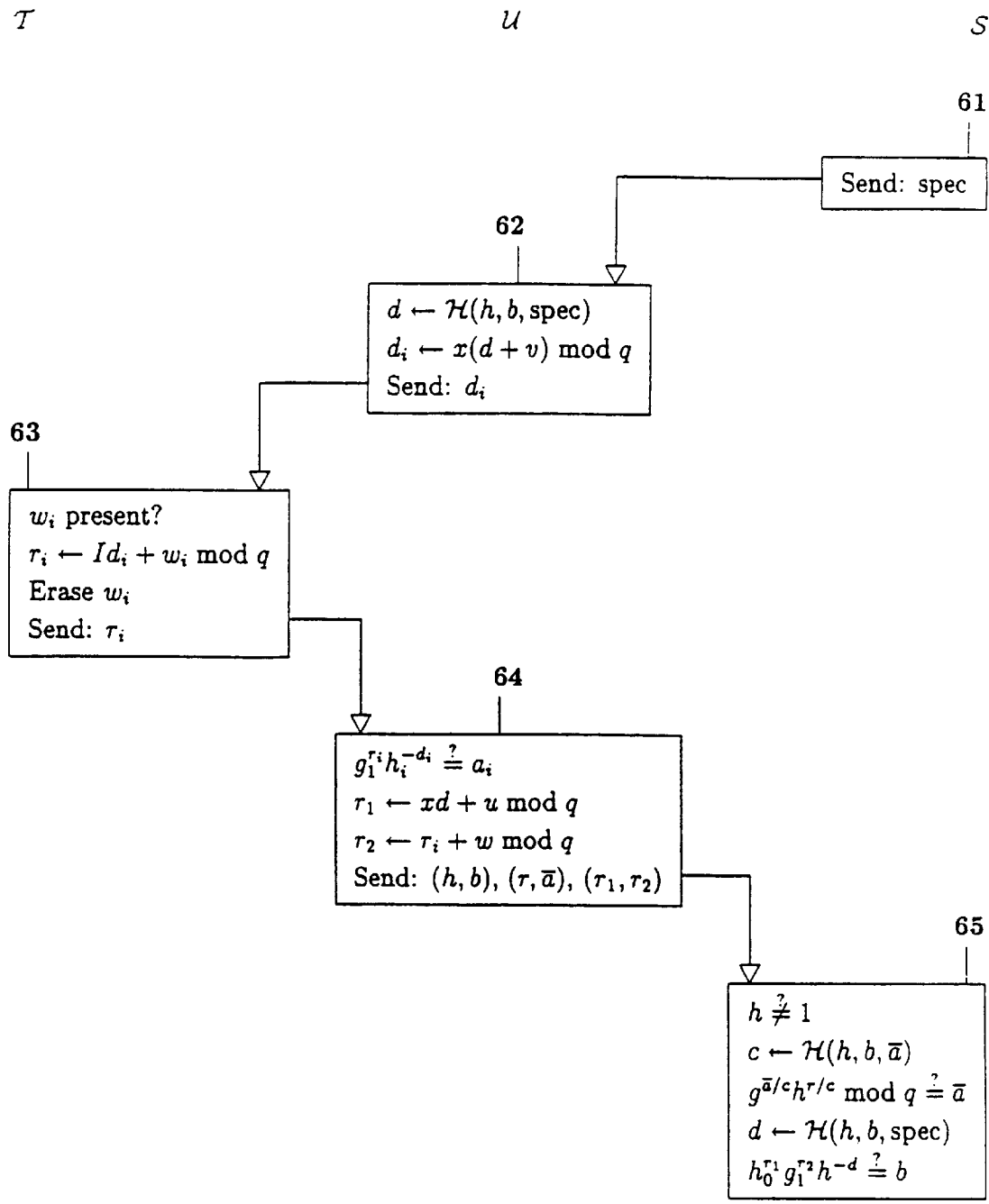
FIG. 6 shows a flowchart of a second coin spending protocol, based on the coin withdrawal protocol of FIG. 5, in accordance with the teachings of the present invention.

Turning now to FIG. 6, a flowchart describing a coin spending protocol, for spending a coin withdrawal in accordance with the flowchart of FIG. 5 to a receiving party $S$, will now be described in detail.

Box 61 is the same as Box 31.

Box 62 is almost the same as Box 32. The only difference is in the manner in which $d_i$ is computed, in the second line.

box 63 is almost the same as Box 33. The only difference is in the manner in which $r_i$ is computed, in the second line, the $T$ need not check that d is unequal to 0 mod q this time.

Box 64 is almost the same as Box 34. The only difference is in the precise manner in which $U$ verifies the correctness of $r_i$ and computes the responses $r_1$ and $r_2$, and in the information $U$ sends to $S$; the modifications are shown by the four lines.

Box 65 is almost the same as Box 35. The only difference is in the manner in which the CA verifies the correctness of the certificate and of $r_1$ and $r_2$.

It is noted that $S$ could equal well perform the verification of the certificate by verifying whether $g^a / ch^{r/c} \bmod q$ equals $\bar{a}$, where c is computed as $\mathcal{H}(h, h_0^{r_1} g_1^{r_2} h^{-d}, \bar{a})$; and the verification of the correctness of $(_1, r_2)$ can be performed by verifying whether d equals $\mathcal{H}(h, h_0^{r_1} g_1^{r_2} h^{-d}, \text{spec})$. In that case $U$ in Box 64 should send d instead of b.

Figure 7:
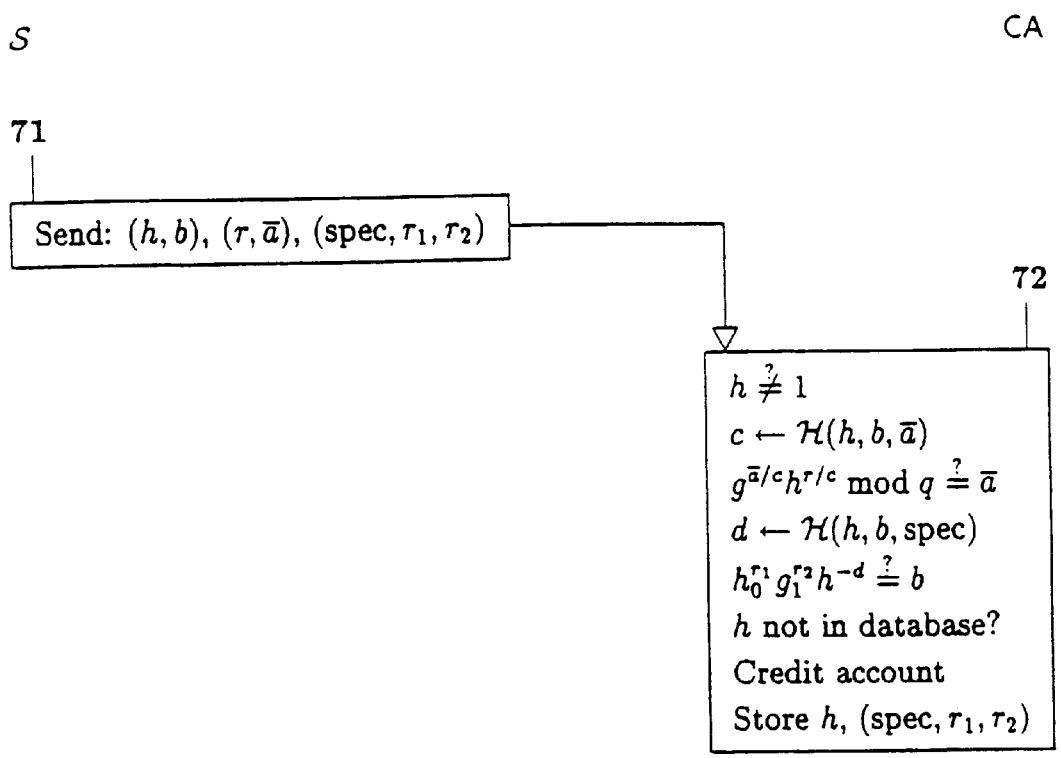
FIG. 7 shows a flowchart of second coin depositing protocol, based on the coin spending protocol of FIG. 6, in accordance with the teachings of the present invention.

Turning now to FIG. 7, a flowchart describing a coin deposit protocol, for depositing at the CA a coin spent in accordance with the flowchart of FIG. 6, will now be described in detail.

Box 71 is almost the same as Box 41, the difference being that the payment transcript now consists of (h,b), (r,$\bar{a}$), en (spec,$r_1,r_2$). (As mentioned above, alternatively d can be sent instead of in b.)

Box 72 is almost the same as Box 42; the first five lines are now the same as in Box 65, and b need not be stored in line eight. The action taken by the CA in case h has already been deposited before is similar to that described for Box 42. Namely, as can easily be verified by those of ordinary skill in the art, $I$ can be computed as $(r_1 - r'_1)^{-1} (r_2 - r'_2) \bmod q$, where $(r'_1, r'_2)$ denotes the already stored pair of the old payment transcript.

This concludes the detailed description. While these descriptions of the present invention have been given as examples, it will be appreciated that various modifications, alternate configurations, and equivalents may be employed without departing from the spirit and scope of the present invention. For example, there are many essentially equivalent orders to evaluate expression; ways to evaluate expressions; ways to order expressions, tests, and transmissions within flowchart boxes; ways to group operations into flowchart boxes; and ways to order flowchart boxes. The particular choices that have been made here are merely for clarity in exposition.

It will be appreciated that all the inventive techniques developed in patent application Ser. No. PCT/NL94/00179, filed Aug. 1, 1994, for applying restrictive blind issuing protocols in privacy-protecting mechanisms for value transport, such as credential mechanisms, can be applied without difficulty to the modified issuing protocols.

Certain omissions, variations and substitutions may be apparent to those of ordinary skill in the art. Although various such omissions, variations and substitutions have been indicated in the text, this may be more fully appreciated in the light of the following examples.

In Boxes 25 and 55, and likewise in Boxes 34 and 64, $U$ can omit the verifications of $r_0$ and $r_i$ most or even all of the time, since erroneous responses will be detected anyway by $S$ at payment time, and hence $U$ can complain to the CA afterwards.

Also, as detailed in U.S. Pat. No. 5,606,617, issued Feb. 25, 1997, by the present applicant, the secret key of $U$ with respect to its public key $h$ can more generally consist of more than exactly two numbers in $\mathbb{Z}_q$ by introducing extra generators of $G_q$. This enables the CA to encode more than just a single blinding-invariant number into $h$. Specifically, the CA can generate additional generators $g_2, \ldots, g_k$ from $G_q$, where each generator is computed by the CA by raising g to a secret power, generated at random from $\mathbb{Z}_q$. Then the public key $h$ of $U$ can be defined to be of the form $h_0^{a_1} g_1^{a_2} \ldots g_k^{a_k}$. It will be clear to those of ordinary skill in the art how to modify FIG. 1 such that the k numbers, $(\alpha_1^{-1} \alpha_2 \bmod q, \ldots, \alpha_1^{-1} \alpha_k \bmod q)$, are all blinding-invariant.

In the definition of a DSA-like secret-key certificate, in the description preceding the description of FIG. 1, one may opt to not apply $\mathcal{H}(\bullet)$ to $h$, so that c is set equal to $h$ instead of $\mathcal{H}(h)$ or $\mathcal{H}(h,a)$. Although it is believed that forgoing such a secret-key certificate on a public key $h$ is infeasible when $h$ must be of the form $h_0^{\alpha_1} g_1^{\alpha_2}$, the hashing is believed to improve security, as with the DSA signature scheme.

Furthermore, a secret-key certificate on a public key $h$ in $G_q$ of $U$ can be defined to be a pair (r,a) in $\mathbb{Z}_q \times G_q$ such that a equals $g^{\bar{a}}/eh^{r/c}$, where c equals $\mathcal{H}(h,a)$; the reason for using $\bar{a}$ mod q instead of a is only for greater storage efficiency of the certificate, as with the DSA signature scheme.

It will also be obvious to those of ordinary skill in the art how parts of the inventive technique and protocols disclosed here can be used to advantage.

What is claimed is:

1. A method for an issuer party to issue secret-key certificates that can be blinded only restrictively, the method comprising the steps of:

generating with a computer a secret key $(x_0, y)$ and a public key $(descr(G_q), g, h_0, g_1, descr(\mathcal{H}(\bullet)))$, wherein q is a prime number;

$G_q$ is a group of order q;

$descr(G_q)$ is a description of $G_q$ including q;

$descr(\mathcal{H}(\bullet))$ is the description of a hash-function $\mathcal{H}(\bullet)$;

$x_0$, and y are elements of the ring, $\mathbb{Z}_q$ of integers modulo q;

g is an element of order q in the group, $G_q$;

$h_0$ is equal to $g^{x_0}$; and $g_1$ is equal to $g^y$;

issuing to a receiver party a secret-key certificate $(r, \bar{a})$ in $\mathbb{Z}_q \times \mathbb{Z}_q$ on a public key h in $G_q$, the secret key certificate being generated with a computer such that $(g^{\bar{a}}/ch^{r/c})$ mod q is equal to $\bar{a}$, where c is computed by applying $\mathcal{H}(\bullet)$ to at least h.

2. A method as in claim 1, whereby c is computed by applying $\mathcal{H}(\bullet)$ to at least h and $\bar{a}$.

3. A method as in claim 1, whereby a secret key of the receiver party corresponding to the public key h is a pair $(\alpha_1, \alpha_2)$ in $\mathbb{Z}_q \times \mathbb{Z}_q$ such that $$h_0^{\alpha_1} g_1^{\alpha_2}$$

equals h, and the quotient $$\alpha_1^{-1} \alpha_2$$

mod q is blinding-invariant.

4. A method as in claim 3, whereby the receiver party, subsequent to the issuing, computes a digital signature with respect to a one-time public key that comprises h, and a verifier party verifies the public key h, the secret-key certificate $(r, \bar{a})$ and the digital signature.

5. A method as in claim 4, whereby the issuing is used for issuing an untraceable electronic coin and the showing is used for off-line spending of the electronic coin.

* * * * *